C. ELLIS.
SHEET HEATING FURNACE.
APPLICATION FILED NOV. 4, 1912. RENEWED DEC. 29, 1916.
1,238,011. Patented Aug. 21, 1917.
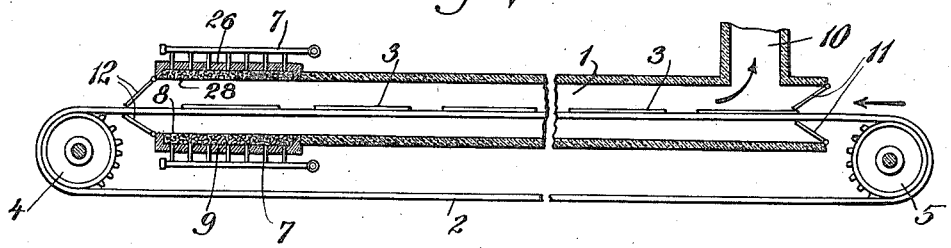
Fig.1,
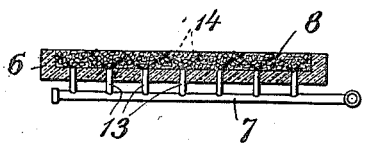
Fig.2,
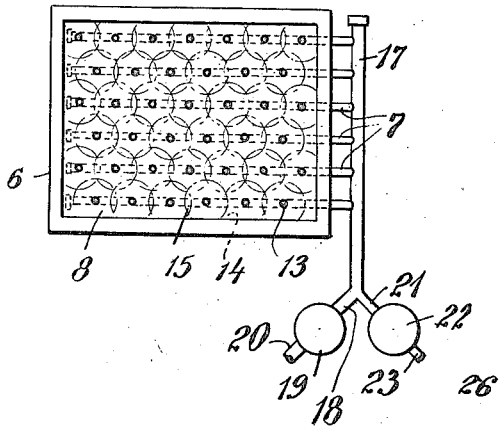
Fig.3,
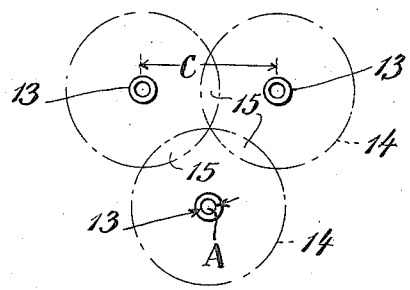
Fig.4,
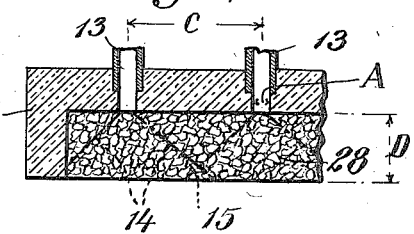
Fig.5,
WITNESSES
Charles Eberhart
Jessie B. Kay
INVENTOR
Carleton Ellis
BY
Duncan & Duncan ATTORNEYS

UNITED STATES PATENT OFFICE.

CARLETON ELLIS, OF MONTCLAIR, NEW JERSEY, ASSIGNOR TO RADIANT HEATING LIMITED, OF ARMLEY, LEEDS, ENGLAND, A CORPORATION OF GREAT BRITAIN.

SHEET-HEATING FURNACE.

1,238,011.      Specification of Letters Patent.      Patented Aug. 21, 1917.

Application filed November 4, 1912, Serial No. 729,316. Renewed December 29, 1916. Serial No. 139,704.

*To all whom it may concern:*

Be it known that I, CARLETON ELLIS, a citizen of the United States, and resident of Montclair, Essex county, New Jersey, have made certain new and useful Invention Relating to Sheet-Heating Furnaces, of which the following is a specification, taken in connection with the accompanying drawing, which forms part of the same.

This invention relates to furnaces which are adapted to heat sheets of steel or other articles as in connection with forging or stamping operations, the furnace comprising a furnace chamber and connected flue and one or more heating devices coöperating with the chamber so as to communicate therethrough with the flue, means, most desirably a conveyer, being provided to carry the plates or other articles through the chamber from the flue end toward the heating devices and admission and discharge doors being preferably used in coöperation with the conveyer. The heating devices comprise most desirably a lower granular bed and also in some cases an upper inverted granular bed having their incandescent working faces arranged to coöperate with the articles in the furnace, each of the granular beds being composed of granules of refractory material heated by the combustion therein of injected explosive gaseous material supplied through injecting apertures which are preferably substantially uniformly spaced apart at suitable distances between centers to insure substantial uniformity of heating throughout the incandescent working faces of these granular beds which can thus quickly and uniformly heat the plates or other articles while the hot combustion gases may be used to preheat the approaching articles to a greater or less extent according to the length of the furnace chamber.

In the accompanying drawing showing in a somewhat diagrammatic way illustrative embodiments of this invention, Figure 1 is a sectional elevation.

Fig. 2 is an enlarged sectional view of one of the granular beds or heating devices.

Fig. 3 is a plan view thereof.

Fig. 4 is a diagrammatic view on a larger scale showing the arrangement of injecting apertures and heat zones; and Fig. 5 is a corresponding enlarged sectional view through part of the granular bed.

The furnace, as diagrammatically illustrated in the drawing, comprises a suitable furnace chamber 1 having walls of refractory material and provided with a flue connection 10 adjacent one end. A suitable conveyer 2 may be arranged to pass through the furnace or have its lateral conveyer chains or carriers mounted in the sides thereof, as is usual, and this conveyer 2 carrying the steel plates or other articles 3 through the furnace may be operated by the drive sprocket 4 and coöperating sprocket 5 at any desired speed. It is desirable in most cases to minimize heat losses by the use of suitable swinging doors or gates coöperating with the conveyer at each end of the furnace so as to make a more or less tight joint while allowing the passage of the conveyer and articles. The pivoted admission doors 11 may be mounted at the admission end of the furnace adjacent the flue and similar discharge doors 12 may be mounted adjacent the heating devices so as to insure the proper circulation of hot gases through the furnace.

As indicated the heating devices employed may be of the granular bed type, one or more combustion beds of granular material being mounted with their incandescent working faces closely adjacent the path of the articles on the conveyer so as to quickly and uniformly heat these articles by the intense and substantially flameless combustion of explosive gaseous mixtures within the granular beds of refractory combustion accelerating material as described in the U. S. patents, Lucke, No. 755,376, and Bone, Wilson & McCourt, No. 1,015,261; that is, the explosive gaseous mixture entering the refractory bed with a velocity in excess of the speed of back-firing is caused to spread out and have its velocity rapidly reduced as it advances through the bed until it reaches a surface or zone at which the velocity of the mixture equals the rate of back-firing at which surface or zone combustion takes place, the combustion being thus localized within the bed. The lower heating device may be in the form of the granular bed 8, the substantially uniformly sized granules of refractory combustion accelerating material, such as alumina, magnesite or even refractory fireclay for the lower heats being of about one-half or three-quarters inch mesh and arranged within a suitable refractory lining, such as 6, so that the upper or working face of this granular bed which is heated to incandescence under operating conditions is preferably relatively closer than indicated in the drawing to the articles and arranged within a few inches of them for most rapid work. If desired, an upper inverted granular bed 28 may also be arranged at the top of this part of the furnace chamber, the refractory granules 28 being permanently secured in position in the refractory bed lining 26 as by coating the particles with a small amount of relatively fusible or fluxing material and then calcining the bed and lining at an intensely high temperature so as to cause the refractory granules to permanently unite together and to the bed lining by fusing or fluxing together their contacting portions at heats considerably in excess of any working temperatures to which they are subsequently subjected. In this way, as indicated, in Figs. 1 and 5, the granules are permanently secured together in such way as to leave numerous tortuous passages between these rough porous granules substantially similar to the passages between a loosely piled bed of such rough porous lumps or granules of refractory material.

These granular beds may be heated by injecting thereinto explosive gaseous mixtures of any suitable combustible gas or vapor and air or other supporter of combustion therefor preferably in about the proportions required to secure complete combustion for greatest efficiency, although of course by using a slight excess of the combustible gas a slightly reducing atmosphere may be maintained in the furnace which minimizes oxidation. The explosive gaseous mixture is injected into the granular bed through injecting apertures 13 which are preferably uniformly spaced throughout the bed to secure uniformity of heating and these injecting nozzles or apertures 13 are preferably so spaced as to secure sufficient overlapping or approximation of the heat zones produced by each of the injecting apertures to secure substantial uniformity of heating throughout the bed which is a highly desirable feature especially in heating thin plates or the like. For moderate sized injecting apertures of three-eighths of an inch to an inch or so diameter through which ordinary coal gas or enriched producer gas is injected after mixture with air of about a pound or so pressure which gives sufficient velocity to prevent back-firing through the injector apertures, the spacing of the injector apertures and the thickness of the granular bed to give a most effective and uniform heat should apparently bear a substantially fixed ratio to the size of the apertures, uniform heating results being secured when $$D = 4A \text{ and } C = 2D = 8A$$

as determined by an extended series of empirical tests; where $D$ is the depth of the granular bed, $A$ is the diameter of the injecting apertures and $C$ the center distance between apertures, that is, the distance between the center lines of adjacent apertures as indicated in Figs. 4 and 5. Under these circumstances, the heating zones from each aperture, while of course somewhat irregular because of the tortuous character and irregular section of the channels through the granular bed, have approximately such boundaries as indicated by the lines 14—14 in Figs. 4 and 5, so that there tends to be some overlapping in the areas 15—15 where the heating zones approach most closely, although these reinforced areas are naturally equalized to a considerable extent by the action of the gas pressure within the granular bed. Not only is a substantially uniform incandescent temperature thus secured throughout the working face of a granular bed of this character, but in addition the use of such refractory combustion accelerating beds makes possible the burning of unusual quantities of gaseous fuel within a very restricted space, the rate of combustion being accelerated many times beyond that occurring in ordinary flame combustion, so that in this way extremely rapid as well as uniform heating can be effected because of the extremely high temperatures secured in the working faces of the incandescent bed and the correspondingly great radiating efficiency thereof. This is of great importance in many stamping and forging operations, especially where thin steel or iron plates are involved, although of course similar granular bed heating units are useful in other connections where intense and uniform heats are desired.

The explosive gaseous mixtures may be conveniently fed to the granular material by any suitable arrangement, such for example as the supply pipes 7 shown in Figs. 1, 2 and 3 as connecting the lines of nozzles 13 communicating with each of the injecting apertures and these supply pipes may of course be connected to suitable supply lines such as 17 fed with explosive gaseous mixtures which may be supplied under the desired pressure by any form of pumps or other devices. The supply line may as indicated have a suitable Y connection, the air connection 18 leading to a suitable air pump 19 and receiving therefrom air under pressure which has been drawn from the air line 20. The gas connection 21 similarly receives the combustible gas or vapor from the gas pump 22 which draws the gas from the gas line 23 so that in this way a substantially uniform explosive mixture of gas and air can be conveniently secured preferably containing a slight excess of gas where steel plates are to be heated so as to maintain a slightly reducing atmosphere within the hot portion of the furnace and minimize oxidation of the metal. The plates or articles 3 fed along by the conveyer into position between the heating devices are of course very rapidly and highly heated by radiant heat from the highly incandescent working faces of the granular beds so that it is not only possible to secure a rapid heating of the articles, but by regulating the amount of fuel burned in the granular beds it is possible to accurately time the feed or supply of these heated articles to a press or forging device so that much more satisfactory results can be secured because of the uniformity of the forging or stamping conditions. Of course by conducting the intensely hot combustion gases along the furnece chamber in the opposite direction to the articles fed along toward the heating devices a considerable preheating can be secured depending upon the length of furnace chamber employed and a corresponding economy in fuel consumption effected.

By the term "explosive gaseous mixture" as used herein is meant a mixture of a suitable combustion supporting gas, either oxygen alone or air or other oxygen containing gas, with combustible matter in a gaseous or other finely divided state in proportions such that the mixture will have the property of self-propagation of inflammation. Such proportions may be the chemical combining proportions or there may, of course, be an excess of either the combustible matter or the combustion supporting gas within the limits which determine the property of self-propagation. The mixture may be varied in this respect according to the desired character of the products of combustion.

Having described this invention in connection with an illustrative embodiment thereof, to the details of which disclosure the invention is not of course to be limited, what is claimed as new and what is desired to be secured by Letters Patent is set forth in the appended claims.

1. A heating furnace comprising in combination a furnace chamber, means for conveying articles to be heated through the furnace chamber, means for burning an explosive gaseous mixture adjacent the path of travel of the articles to be heated and for permitting the products of combustion to enter the furnace chamber, and a flue leading from the furnace chamber at a point distant from the place of combustion in a direction longitudinal of the path of movement of the articles to be heated.

2. A heating furnace comprising in combination a furnace chamber, a heating device communicating with the furnace chamber, a flue leading from the furnace chamber at a point distant from the heating device, and means for conveying articles to be heated through the chamber in the direction from said flue to the heating device, said heating device comprising means for burning an explosive gaseous mixture adjacent the path of travel of the articles to be heated and for permitting the products of such combustion to enter the furnace chamber.

3. A heating furnace comprising in combination a furnace chamber, a heating device communicating with the furnace chamber, a flue leading from the furnace chamber at a point distant from the heating device, and means for conveying articles to be heated through the furnace chamber in the direction from said flue to the heating device, said heating device comprising a porous bed of refractory material in close proximity to the path of travel of the articles to be heated, and means for supplying to said bed an explosive gaseous mixture at a velocity in excess of the speed of back-firing of the mixture.

4. A heating furnace comprising in combination a furnace chamber, heating devices communicating with the furnace chamber, a flue leading from the furnace chamber at a point distant from the heating devices, means for conveying articles to be heated through the furnace chamber in the direction from said flue to the heating devices, said heating devices comprising porous beds of refractory material set on opposite sides of the path of travel of the articles to be heated and in close proximity thereto, and means for supplying to said beds an explosive gaseous mixture moving with a velocity in excess of the speed of back-firing of the mixture.

5. A heating furnace comprising in combination a furnace chamber, means for conveying articles to be heated through said chamber, an inverted porous bed of refractory material set above and in close proximity to the path of travel of the articles to be heated, means for supplying an explosive gaseous mixture to said bed to burn therein and to heat the face thereof adjacent the path of travel of the articles to be heated to incandescence, and a flue leading from the furnace chamber at a point distant from said combustion bed.

6. A sheet heating furnace comprising in combination a furnace chamber, means for conveying sheets or plates to be heated through said chamber, heating means comprising a lower porous bed of refractory material and an upper inverted porous bed of refractory material set adjacent the path of travel of the sheets or plates to be heated, means for supplying an explosive gaseous mixture to said beds to burn therein and to heat the faces thereof adjacent the path of travel of the sheets or plates to be heated to incandescence, and a flue leading from the furnace chamber at a point distant from the heating means in the direction to cause the combustion gases to move through the chamber in the direction opposite to the direction of movement of the sheets or plates to be heated.

CARLETON ELLIS.

Witnesses:
HENRY EDMUNDS,
JESSIE B. KAY.